(12) United States Patent
Grossinger (10) Patent No.: US 9,749,513 B2
(45) Date of Patent: Aug. 29, 2017

(54) SYSTEM AND METHOD FOR GENERATING A LIGHT PATTERN FOR OBJECT ILLUMINATION

(71) Applicant: Facebook, Inc., Menlo Park, CA (US)

(72) Inventor: Nadav Grossinger, Karmei Yosef (IL)

(73) Assignee: Facebook, Inc., Menlo Park, CA (US)

( * ) Notice: Subject to any disclaimer, the term of this patent is extended or adjusted under 35 U.S.C. 154(b) by 21 days.

(21) Appl. No.: 14/699,114

(22) Filed: Apr. 29, 2015

(65) Prior Publication Data

US 2015/0310670 A1      Oct. 29, 2015

Related U.S. Application Data

(60) Provisional application No. 61/985,593, filed on Apr. 29, 2014.

(51) Int. Cl.
| | |
|---|---|
| H04N 5/225 | (2006.01) |
| G02B 27/01 | (2006.01) |
| H04N 5/33 | (2006.01) |
| G06F 1/16 | (2006.01) |
| G06F 3/01 | (2006.01) |
| G06F 3/03 | (2006.01) |

(52) U.S. Cl.
CPC ......... *H04N 5/2256* (2013.01); *G02B 27/017* (2013.01); *G06F 1/163* (2013.01); *G06F 3/011* (2013.01); *G06F 3/017* (2013.01); *G06F 3/0304* (2013.01); *H04N 5/33* (2013.01)

(58) Field of Classification Search
CPC ...... H04N 5/2256; H04N 5/33; G02B 27/017; F21V 5/00; F21V 5/002; F21V 5/004; F21V 5/005; F21V 5/008; F21V 5/04; F21V 5/045
See application file for complete search history.

(56) References Cited

U.S. PATENT DOCUMENTS

| | | | | |
|---|---|---|---|---|
| 6,002,520 | A | * 12/1999 | Hoch | ................... G02B 5/1842 359/15 |
| 6,069,748 | A | 5/2000 | Bietry | |
| 6,688,758 | B2 | 2/2004 | Thibault | |
| 8,009,358 | B2 | 8/2011 | Zalevsky et al. | |
| 8,384,997 | B2 | 2/2013 | Shpunt et al. | |
| 8,749,796 | B2 * | 6/2014 | Pesach | ................... G01B 11/25 356/610 |
| 8,908,277 | B2 * | 12/2014 | Pesach | ................... G01B 11/25 359/619 |
| 9,507,411 | B2 * | 11/2016 | Grossinger | ............. G06F 3/017 |
| 2011/0075259 | A1 | 3/2011 | Shpunt | |
| 2014/0111616 | A1 | 4/2014 | Blayvas | |
| 2015/0097947 | A1 | 4/2015 | Hudman et al. | |

* cited by examiner

*Primary Examiner* — Bao Q Truong
(74) *Attorney, Agent, or Firm* — Fenwick & West LLP (57) ABSTRACT

A method and system for generating light pattern. The system may include: a light source providing a diverging light beam; a single lens element having first surface with a positive optical power in at least one cross section and a second surface. The second surface is configured to provide a multiplication function of the light beam in that cross section and a predefined intensity light distribution generator in a second cross section.

10 Claims, 10 Drawing Sheets

SYSTEM AND METHOD FOR GENERATING A LIGHT PATTERN FOR OBJECT ILLUMINATION

RELATED APPLICATIONS

The present application claims priority to U.S. Provisional patent application No. 61/985,593, filed Apr. 29, 2014. The contents of the aforementioned application are incorporated by reference in their entirety.

FIELD OF THE INVENTION

The present invention relates to a system and method for generating a pattern using a light source such as a laser source.

BACKGROUND INFORMATION

Laser Line Generators are used to create laser lines in a variety of alignment, scanning, or machine vision applications construction and process control. Laser Line Generators are lasers that use a focusing mechanism or laser head to shape the laser output into a line. Many Laser Line Generators can also be used to generate other patterns as well. A laser line generator system includes a laser source with an optical element configured to generate the laser line instead of a point (e.g. laser pointer). By using lasers it becomes possible to project individual and multiple lines for use with, for example image processing.

SUMMARY OF INVENTION

It is an object of the present invention to provide an optical system for generating a pattern such as a multi-line pattern.

It is another object of the present invention to provide an optical system for generating a light pattern such as a multi-line pattern or a curve pattern using a single or two lens optical elements.

According to a first aspect of the invention there is provided a laser generator system comprising a light source such as a laser source with a diverging beam including a single optical lens with a first and second optical surfaces wherein the first and second optical surfaces are perpendicular to the beam direction. According to one embodiment the first surface has a positive optical power in a first cross section of the beam and the second surface has at least negative optical power in the second cross section of the beam, or a combination of different optical power sections.

In an embodiment, the system is configured to spread the beam in a first direction in a predefined intensity light distribution (e.g. such as a line) and multiplying (replicating) the line in a second orthogonal direction, thus creating a multi-line pattern.

According to a second aspect of the invention there is provided a system comprising a light source such as a laser source with diverting beam including a first and second optical lens elements wherein the first element has a positive optical power on a first surface and a multiplication function on a second surface of the first element and at least a negative optical power in the first surface of the second lens element.

In an embodiment, the multiplication function may be obtained by a diffractive surface.

In an embodiment, the first and second elements are coupled to one another by welding or other known attachment techniques for coupling the two lens elements.

In an embodiment, the diffractive surface of the second lens element faces the surface of the first lens element to protect the sensitive diffractive surface and prevent any unwanted contact by an external element with the diffractive surface.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

The subject matter disclosed may best be understood by reference to the following detailed description when read with the accompanying drawings in which.

DETAILED DESCRIPTION

The present invention relates to a system and method for generating a pattern using a light source such as a laser source. According to one embodiment of the invention the pattern may include one or more lines which may be continuous in a first direction and discrete in a second direction. According to another embodiment the lines may be curved or not substantially straight.

Single Lens Element

Figure 1:
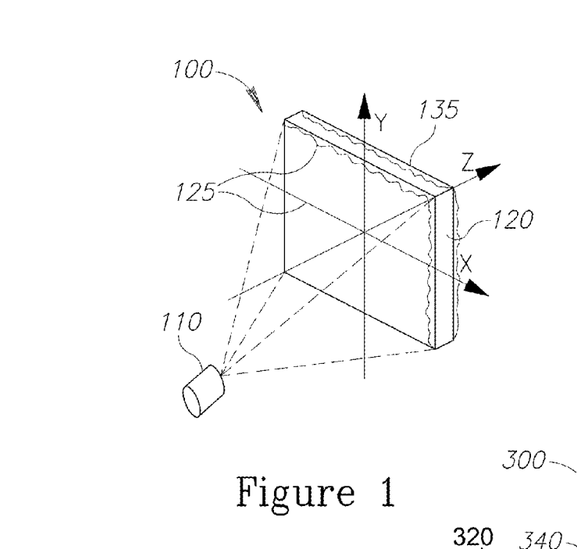
FIG. 1 is schematic view of a pattern generator system including a single optical lens element, in accordance with embodiments of the invention.

Reference is now made to FIG. 1, illustrating a configuration of a pattern generator system 100 according to a first embodiment of the invention. The system 100 may include a light source such as a laser diode light source 110 and a single optical lens element 120. For convenience of explanation, the system is described with reference to an X-Y-Z Cartesian coordinate system in which the light source directs a beam in a Z-direction. The optical element 120 may provide the following three functions (not specifically in this order), thus generating a pattern such as multi-line pattern in the space or on a surface or object: a) Line generation, b) Multiplication, and c) collimation.

According to a first embodiment of the invention there is provided a single lens optical element 120 which includes at least two surfaces, a first optical surface 125 and a second optical surface 135. In a first cross section such as the Y-Z axis cross section of the first optical surface 125 the lens element 120 has a positive optical power. This positive optical power is used to collimate the laser light in the slow divergence section.

According to some embodiments of the invention the collimation function may be provided by a cylindrical surface such as a smooth cylindrical surface. The focal length f for the cylindrical collimator and the radius of the surface are obtained by the Lensmaker's Eq (1), where R2=0 as follows:

$$\frac{1}{f} = \frac{n-1}{R_1} \quad (1)$$

Where R1 is the cylindrical radius and n is the refractive index.

In another embodiment, the collimator surface can also be rotationally symmetrical to add power in both axes, or alternatively use a different focal length for each Cartesian coordinate of the surface (i.e., in both the X- and Y-directions. In this case the cross section of each axis will have different radius, using the same formula for each axis:

$$\frac{1}{f_x} = \frac{n-1}{R_x} \text{ and } \frac{1}{f_y} = \frac{n-1}{R_y})$$

According to another embodiment, the collimation function may include a Cylindrical Fresnel surface—the same cylindrical surface modulated by the size $$\frac{\lambda}{n-1},$$

which is the propagation distance to achieve a phase difference of $2\pi$.

In a second cross section, such as X-Z axis cross section of the first surface 125 or the second surface 135, the lens element 120 has a line generator. The line generator may be in the form of a positive optical power such as aspheric lens, cylindrical lens or diffractive element or a negative optical surface or a combined negative/positive surface etc. The single optical element 100 further includes a beam splitting element formed in a first cross section such as the Y-Z cross section of the second surface 135.

The beam splitting optical element may be a Beam Splitter DOE (Diffractive Optical Element) operated according to the wave nature of light and Huygens' Principle. The designing of the diffractive pattern for a beam splitter follows the same principle as a diffraction grating, with a repetitive pattern etched on the surface of a substrate. The depth of the etching pattern may be designed according to the following Eq (2)

$$h = \frac{\lambda}{2(n-1)} \quad (2)$$

Where $\lambda$ is the laser wavelength; and
n is the refractive index of the material.

According to some embodiments of the invention, the etching in the optical elements' surfaces (e.g. of the first surface 125 or the second surface 135 of the lens element 120) include a number of periods defined as identical sub-pattern units that repeat cyclically. The width d of the period is related to the separation angle $\theta$ between output beams according to the following grating Eq. (3):

$$d\sin\theta_{m=m\lambda} \quad (3)$$

where m represents the order of the diffracted beam, with the zero order output being the undiffracted continuation of the input beam.

While the grating equation (3) determines the direction of the output beams, it does not determine the distribution of light intensity among those beams. The power distribution is defined by the etching profile within the unit period, which can involve many (e.g. not less than two) etching transitions of varying duty cycles.

In a 1-dimensional diffractive beam splitter, the diffractive pattern is linear, while a 2-dimensional element will have a complex pattern.

According to one embodiment of the present invention, the DOE may be manufactured using Lithography methods.

The line generation function according to some embodiments of the present invention may be utilized by the following optical elements and methods:

(a) DOE—a DOE that is designed in much the same way described above, and has multiple close spots in a way that forms a line. The angle separation of the spots, defined by the grating equation, needs to be less than the spot angular width, which is defined by the laser initial electric field (such as beam quality and divergence) and the collimation focal length used.

(b) Homogenizer—A DOE with random non-periodic cross section in one axis only, which causes diffusion in the random axis only. A homogenizer is a piece of laboratory equipment used for the homogenization of various types of material, such as tissue, plant, food, soil, and many others.

(c) A surface with curve changing only in one Cartesian dimension, such as cylindrical surface or one-dimensional cone surface (such as Powell lens).

(d) An array of cylindrical lenses. The width of each lens is small compared to the size of the laser beam entering the optical element.

(e) Fresnel Powell\cylindrical lens—the same Powell\cylindrical surface described above modulated by the size $$\frac{\lambda}{n-1},$$

which is the propagation distance to achieve a phase difference of $2\pi$.

According to some embodiments of the present invention the Line generator function and beam splitter DOE function may be on the same optical surface utilizing a DOE which includes beam splitting element, which forms separate points, and line generating element (by multiple spots or by a random surface—Homogenizer), which forms a line. These two optical elements may be combined in a single surface to achieve multiple lines, by adding the surface profile of the two designs and use the same manufacturing method.

In another embodiment a beam splitter DOE may be combined with a Fresnel line generator on the same surface, by adding the designs of the two surfaces or by a Lithography of the beam splitter DOE surface on a cylindrical/aspheric surface.

Figure 7A:
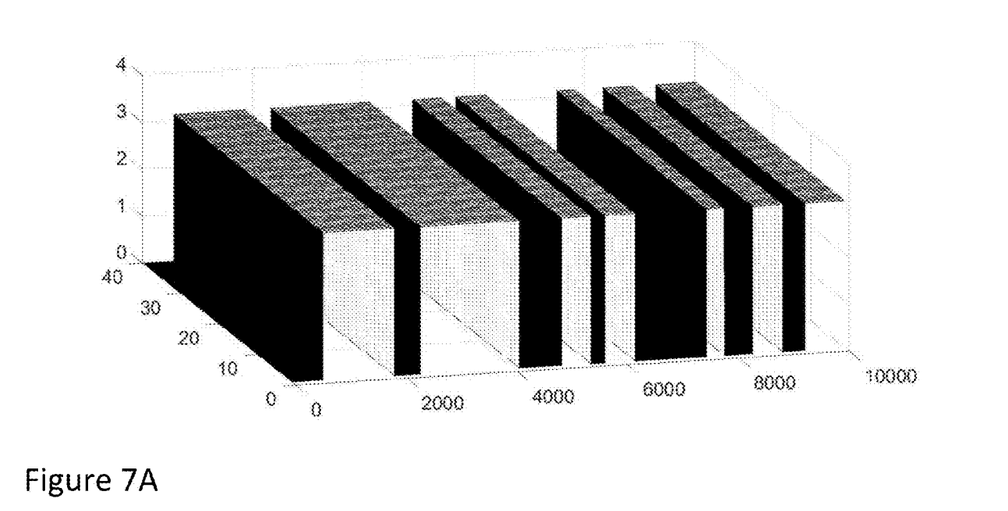
FIGS. 7A-7H are diagrams of possible patterned light generators in accordance with embodiments of the present invention.

Reference is now made to FIGS. 7A-4H illustrating embodiments of a DOE included in a single optical element according the present invention. FIG. 7A illustrates a 1D (one dimension) Binary DOE. In an exemplary embodiment of the invention, the DOE is a fraction of a 1×45 multi-spot Binary DOE yAxis 0-Pi, period size 47 micron, for refractive index=1.4532 and wavelength 0.808 micron the etching depth is 0.8914 micron.

Figure 7B:
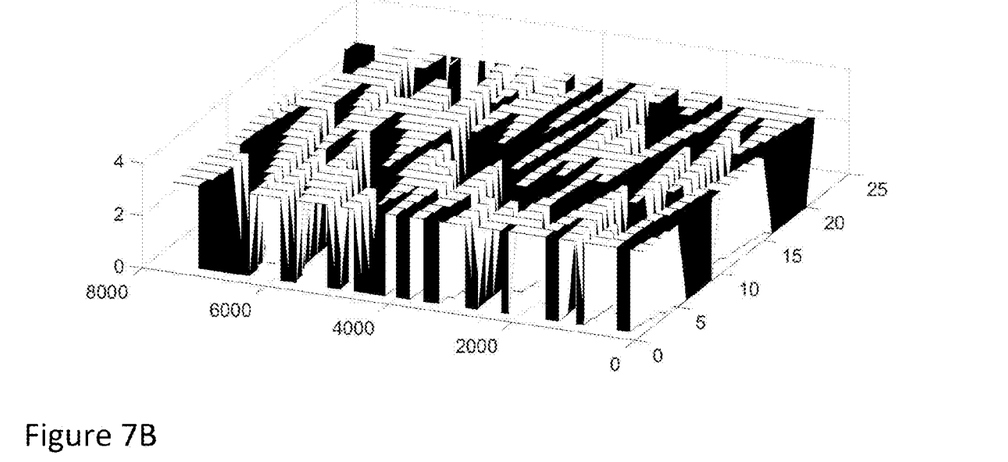

FIG. 7B illustrates a 2D (two dimension) Binary DOE. In an exemplary embodiment of the invention the 2D binary DOE is A fraction of a 11×45 multi-spot Binary DOE yAxis 0-Pi, period size 30 micron×954 micron, for refractive index=1.4532 and wavelength 0.808 micron, the etching depth is 0.8914 micron.

Figure 7C:
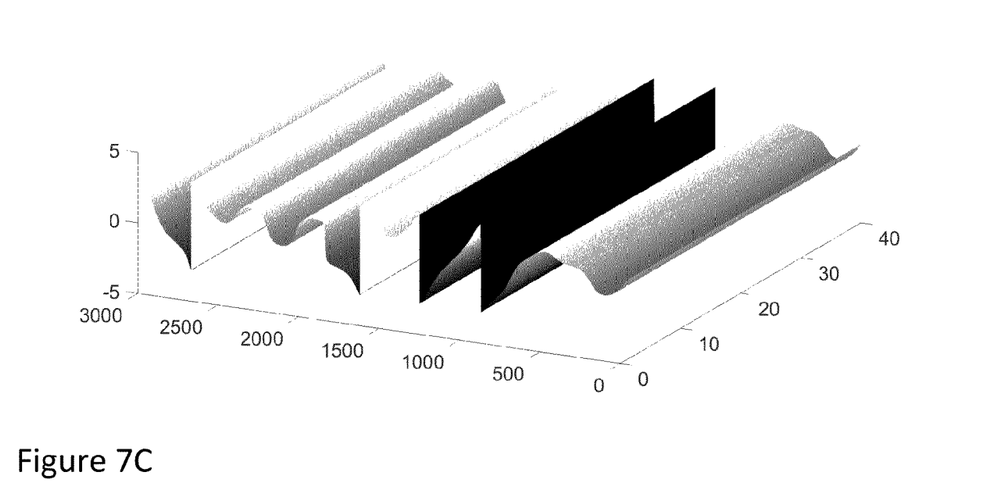

FIG. 7C illustrates a 1D Multi Level DOE. In an exemplary embodiment of the invention the DOE is a fraction of a 1×41 multi-spot multi-level DOE, yAxis 0-Pi, period size 47 micron, for refractive index=1.4532 and wavelength 0.808 micron the etching depth is 0.8914 micron.

Figure 7D:
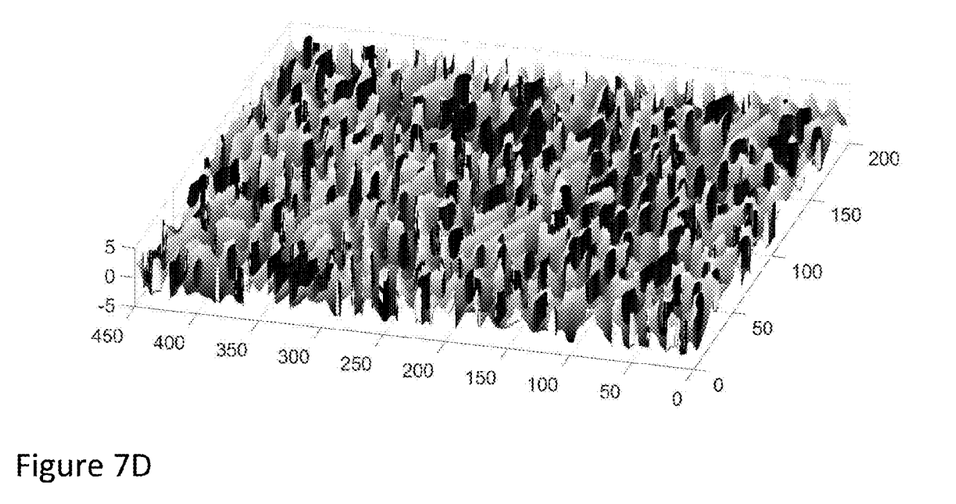

FIG. 7D illustrates a 2D Multi Level DOE. In an exemplary embodiment of the invention the DOE is a fraction of a 601×41 multi-spot multi-level DOE, yAxis 0-Pi, period size 494 micron×47 micron, for refractive index=1.4532 and wavelength 0.808 micron the etching depth is 0.8914 micron.

Figure 7E:
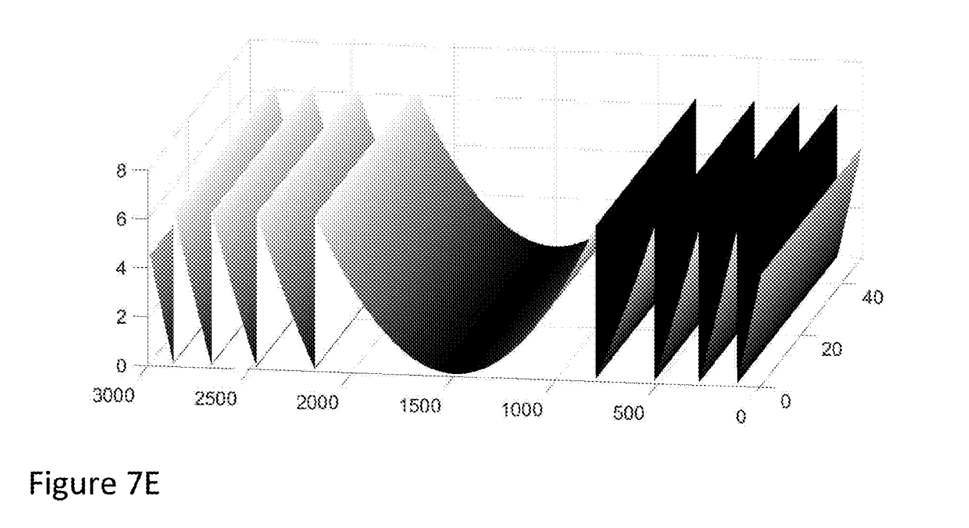

FIG. 7E illustrates an optical element of the line generation function in the form of a Top Hat. In an exemplary embodiment of the invention the line generation optical element is a fraction of a top hat line generator (e.g. diffractive Powell lens) for laser beam divergence of 5 degrees. Line full angle is 65 degrees, Y Axis 0-2*Pi, for refractive index=1.4532 and wavelength 0.808 micron the etching depth is 1.7829 micron.

Figure 7F:
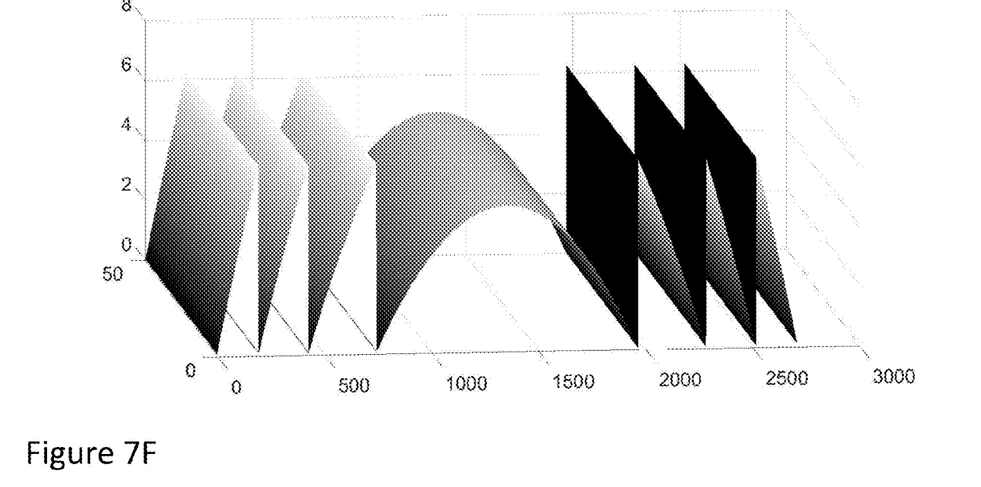
Figure 7G:
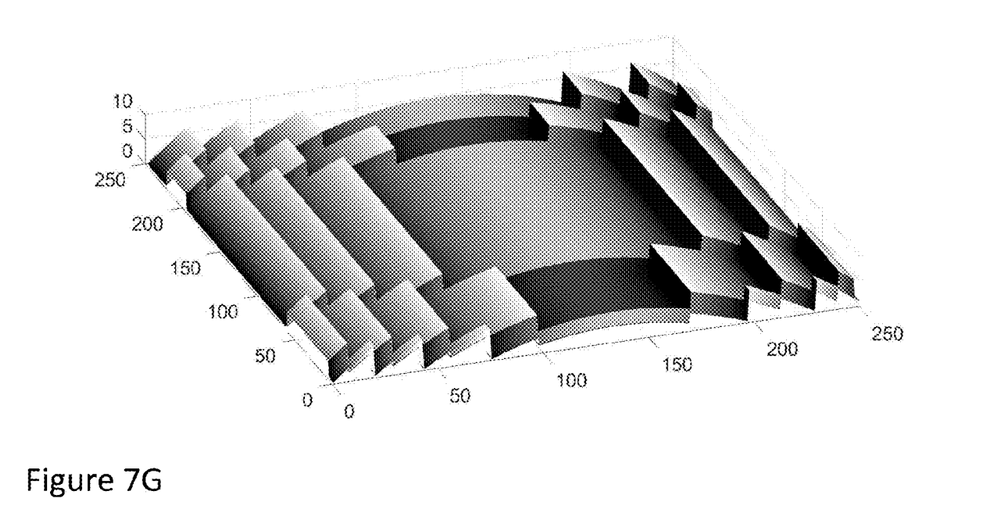

FIG. 7F illustrates an optical element of the collimation function. In an exemplary embodiment of the invention the optical element is a fraction of a 3.8 mm focal length cylindrical diffractive collimator, y Axis 0-2*Pi, for refractive index=1.4532 and wavelength 0.808 micron the etching depth is 1.7829 micron. FIG. 7G illustrates an optical element of the collimation function and DOE in a single optical element. In an exemplary embodiment of the invention the optical element is a fraction of a 3.8 mm focal length cylindrical diffractive collimator and a 1×9 multi-spot, yAxis 0-2*Pi, period size of the multi-spot is 30 micron, for refractive index=1.4532 and wavelength 0.808 micron the etching depth is 1.7829 micron.

Figure 7H:
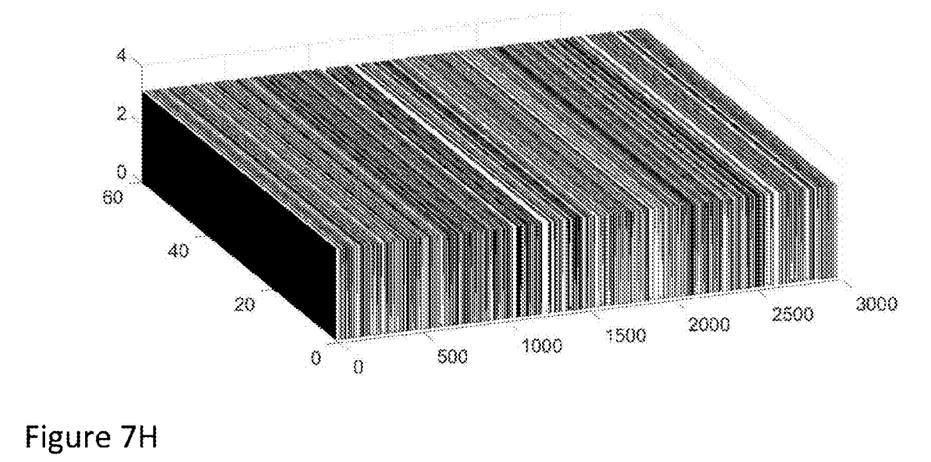

FIG. 4H illustrates an optical element of a Homogenizer (e.g. diffractive line generator). In an exemplary embodiment of the invention the optical element is a fraction of 120 degree homogenizer (diffractive line generator), yAxis 0-Pi, for refractive index=1.4532 and wavelength 0.808 micron the etching depth is 1.7829 micron.

Two Lens Elements

Figure 2:
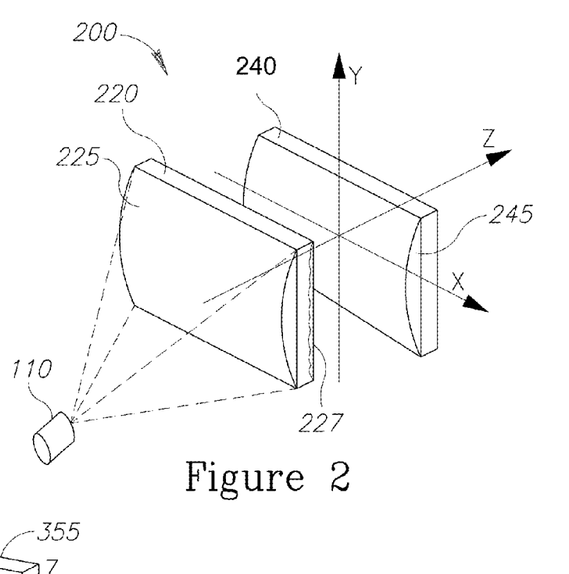
FIG. 2 is schematic view of a pattern generator system including two optical lens elements, in accordance with embodiments of the invention.

Reference is now made to FIG. 2, illustrating a configuration of a pattern generator system 200 according to a second embodiment of the invention. The system 200 may include a light source such as a laser diode light source 110 and two optical lens elements, a first lens element 220 and a second lens element 240. Again an X-Y-Z Cartesian coordinate system is used, with the light source 110 producing a light beam in the Z-axis direction. In at least one cross section (e.g. the fast or the slow axis) such as in a Y-Z axis cross section of a first surface 225, the first lens element 220 has a positive optical power and in the other cross section (i.e. the X-Z axis cross section) of the first optical element 220 a multiplication function is provided in the second surface 227 for splitting the beam provided by the laser source 110.

Adjacent or in the proximity to the first lens element 220 a second lens element 240 is provided. The second lens element 240 is configured to generate a pattern such as a line pattern. The line pattern may be provided at a first cross section of a first surface 245 of the second element 240 for example in a Y-Z axis cross section of the first surface 245.

Figure 3:
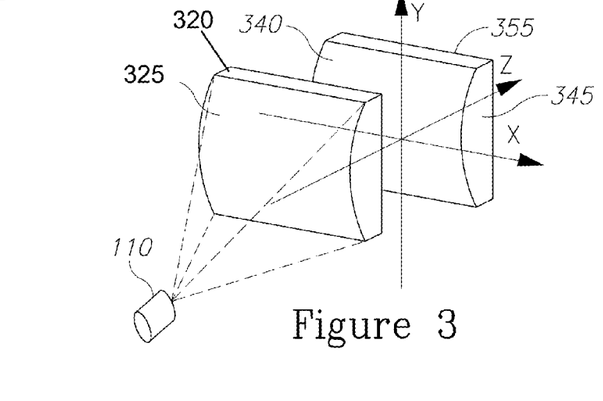
FIG. 3, is schematic view of a pattern generator system including two optical lens elements in accordance with another embodiments of the invention.

Reference is now made to FIG. 3, illustrating a configuration of a pattern generator system 300 according to a third embodiment of the invention. The system 300 may include a light source such as a laser diode light source 110 and two optical lens elements, a first lens element 320 and a second lens element 340. Again an X-Y-Z Cartesian coordinate system is used, with the light source 110 producing a light beam in the Z-axis direction. In at least one cross section such as in a Y-Z axis cross section of a first surface 325 of the first lens element 320 has a positive optical power.

Adjacent or in the proximity to the first lens element 320 there is provided a second lens element 340 for generating two functions: 1) Line generation, and 2) Multiplication. For example, a pattern such as a line pattern is formed at a first cross section (i.e. Y-Z cross section) of the first surface and multiplication function is formed in the other cross section (i.e. X-Z cross section) of the second surface 355.

According to some embodiments of the invention the first and second elements 320, 340 may be coupled to one another by a welding of gluing techniques known in the art.

According to another embodiment of the invention the diffractive surface of the second lens element 340 faces the surface of the first lens element 320 to protect the sensitive diffractive surface and prevent any contact of unwanted external element with the diffractive surface.

According to some embodiments of the invention the line generation function may be formed using a positive optical surface, a combined negative/positive surface or a diffractive surface.

According to some embodiments of the invention the diffractive beam multiplication function may be combined with the line generation function on the same surface, keeping the outer side of the optical element with no optical function at all.

Figure 4:
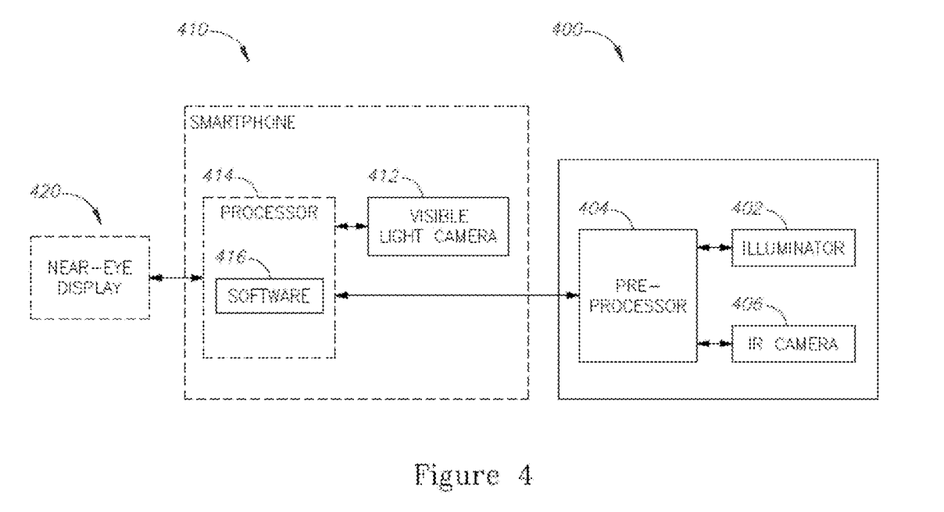
FIG. 4 is schematic view of a device according to some embodiments of the present invention.

Reference is now made to FIG. 4 which is a block diagram illustrating a virtual reality (VR) system, which includes a portable computing platform 410, a near-eye display 412 coupled to the portable computing platform 410, and a body motion capture device 400 also coupled to the portable computing platform 410. In some embodiments, the portable computing platform 410 may be smartphone, though it may instead be laptop a personal computer (PC), a tablet PC, or the like. In some embodiments, the near-eye display 412 may be the screen of the smartphone 410, with the smartphone itself being mounted in a virtual reality headset. The body motion capture device 400 may be configured to capture gestures, facial expressions, arm and leg movements, etc. of a user. The body motion capture device 400 itself may be mounted on the virtual reality headset and is coupled to the smartphone 410.

According to some embodiments, the device 400 has an architecture including the optical elements shown in FIGS. 1-3 and its immediate environment as explained above. Thus, device 400 may include an illuminator 402 or transmitter such as an IR illuminator comprising the light source 110 and one of the elements 100, 200 or 300 illustrated in FIGS. 1-3. The illuminator 402 is configured to illuminate the scene with patterned light. The device 400 also comprises an IR camera 406 configured to receive the reflections of the patterned light and a pre-processor 404 configured to carry out initial processing of data from IR camera 406. Device 400 is further configured to interface with the smartphone 410 which may include a processor 414 and software modules associated with device 400 which are executed by smartphone processor 414. Smartphone 410 may be further connected to the near eye display 420 configured to present a user with synthetic scene and further with 3D images of bodily parts (e.g., hands) of the user.

In operation, the reflected IR pattern illuminated by illuminator 402 is captured by IR camera 406 and after some initial processing by pre-processor 404 the data is conveyed to the smartphone 410. The processor 414 of smartphone 410 together with the dedicated software 416 generates a depth map of body parts of the user, based on the reflected pattern. A visible light camera 412 of the smartphone 410 may be configured to capture 2D color images of the same body parts (e.g., hands) of the user that were illuminated with the patterned light. Thus, processor 414 may use both the depth map and the 2D color images of the body parts, to generate 3D color images of the captured body parts. Finally, processor 414 is configured to superimpose the generated 3D color images of the captured body parts onto the synthetic VR scene so that the user will be able to view, via near eye display 420 both the VR scene and his or her captured body parts (e.g., hands) as 3D color images, positioned and orientated as they are in real life.

Figure 5A:
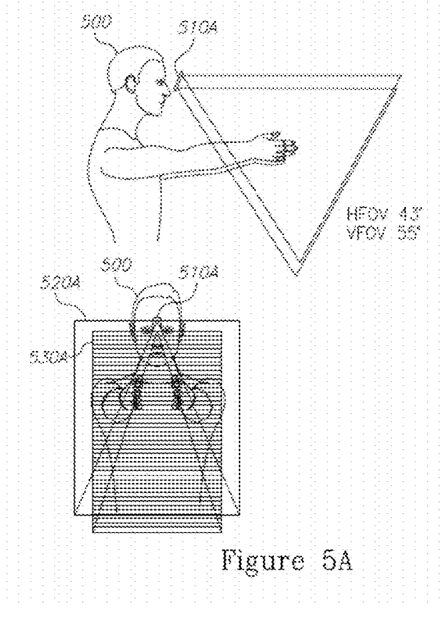
FIGS. 5A and 5B are diagrams illustrating an aspect in accordance with embodiments of the present invention.
Figure 5B:
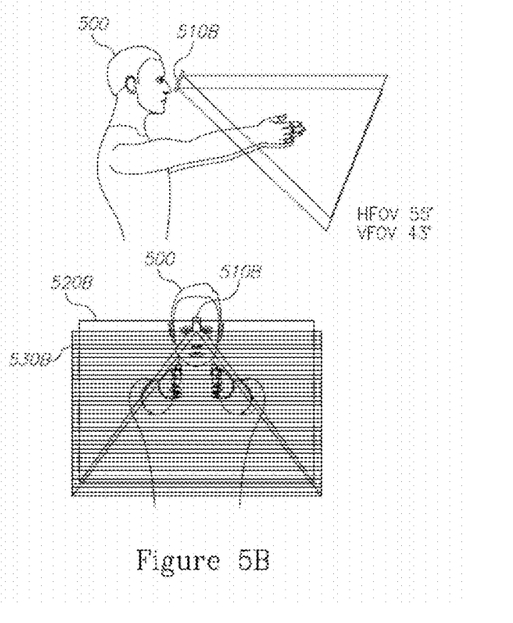

FIGS. 5A and 5B are diagrams illustrating an aspect in accordance with some embodiments of the present invention. User 500 is seen wearing device 510 in accordance with some embodiments of the present invention. It is noted that only the device is shown here, for the sake of simplicity, without its accompanying headset. FIG. 5A illustrates the field of view of both the illuminator and the IR camera of device 510. The area covered by the patterned light 530A is substantially overlapping the area covered by the IR camera 520A shown in a portrait configuration. FIG. 5B show similar overlapping field of views but in a landscape configuration where IR camera is rotated 90° and the illuminator may rather also be rotated or alternatively its pattern generating surface is being stretched to become landscape in nature. The use of landscape orientation is advantageous for VR application where the entire span of the hands is important for enabling natural postures and gestures to be carried out and monitored. During experimentations, the inventors have discovered that a horizontal field of view of approximately 43° and a vertical field of view of approximately 55° yield good results for embodiments of the present invention in portrait configuration. Similarly a horizontal field of view of approximately 55° and a horizontal field of view of approximately 43° yield good results for landscape configuration. It is understood that other field of views may be used with other devices in accordance with other embodiments of the present invention.

Figure 6:
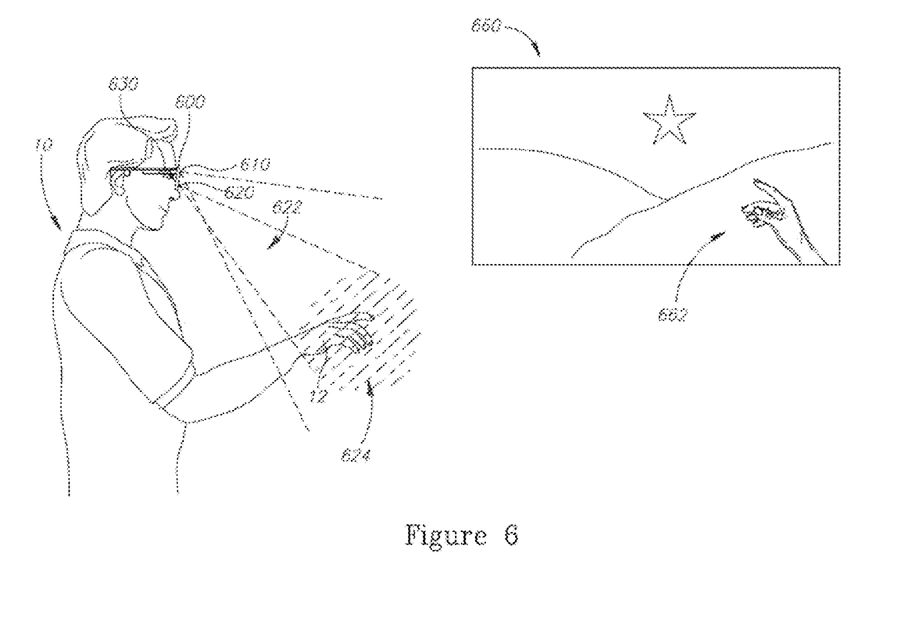
FIG. 6 is schematic view of a device operative in its immediate environment according to some embodiments of the present invention.

FIG. 6 is a schematic diagram illustrating the device at its usual environment according to embodiments of the present invention. User 10 wears a near eye display 630 on which device 600 may be mounted possibly as an add-on as explained above. Device 600 may include an illuminator (e.g., laser transmitter) 620 and a capturing unit (e.g., camera) 610 whose field of view is wide enough to include any surrounding of the user as explained above.

In operation, near eye display 630 is configured to project a synthetic scene onto both eyes of user 10. Illuminator 610 may illuminate a vicinity of user 10 with patterned light 624. Reflections of the patterned light may be captured by capturing device 610 and then analyzed by a computer processor (not shown here) which may be located, for example, on a smartphone coupled to near eye display 630. A visible light camera of the smartphone (or alternatively a part of device 600) is configured to capture 2D images of a user's hands or other gesturing object controlled by user 10. At the same time, the processor of the smart telephone is configured to compute a depth map of the hands or gesturing object and then merge the data of the depth map and the visual images into 3D images of the hands 662 that can be imported into a corresponding location at the virtual image 660. This way, 3D images of the hands of user 10 are being superimposed, while maintaining their 3D attributes, onto the VR scene.

According to an exemplary embodiment, the tracking of the movement of the hand is carried out, using a light pattern designed to enable detection of hand movement, such as fine movements of fingers and thumbs. The use of structured light may be, for instance, as disclosed in U.S. Published Patent Application No. 2014/0346334A1 and/or U.S. Published Patent Application No. 2012/0194561A1, both of whose contents are incorporated by reference in their entirety.

The specifically designed light pattern allows the tracking of the movement, even in bi-dimensional video data, which unlike three dimensional depth map, does not provide for easy separation of the hands from the rest of the body.

Optionally, the light pattern may be specifically designed to track movement of the hand's digits in a bi-dimensional video data (e.g., video images streamed from a regular video camera). More specifically, the light pattern may be designed to enable detection and tracking of digits (i.e., fingers and thumb) as well as palm, in the bi-dimensional video data, according to distortions of the pattern by the digits.

Optionally, the light pattern has a continuous feature in a first direction (say, the X-axis) and a non-continuous (say, periodic) feature in a direction substantially perpendicular to the first direction (say, the Y-axis). In one example for such a pattern, the light pattern includes several stripes arranged in parallel (or in near parallel) to each other.

Figure 8:
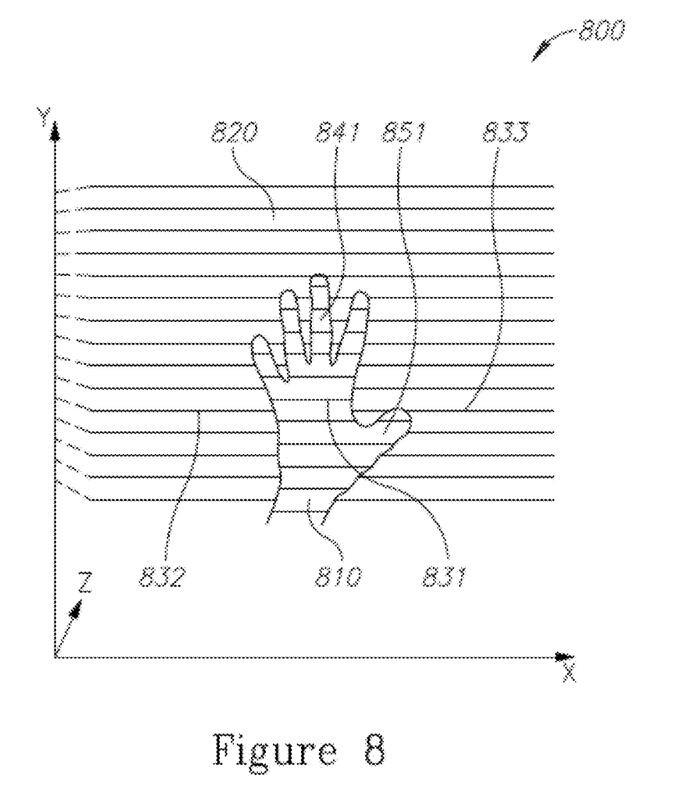
FIG. 8 is schematic view of an aspect of a patterned light in accordance with embodiments of the present invention.

FIG. 8 is a diagram illustrating an aspect of a patterned light in accordance with embodiments of the present invention.

Following below is a more detailed explanation relating to how the generated patterned light is used to track the gestures made by the user. According to an exemplary embodiment, a sensor (not shown here) may be positioned in a certain Y-axis distance, for example near a transmitter which projects the stripes pattern on the hand 810 and on the background 820 (say, a surface of a table the hand rests on, a wall, etc.). The position of the sensor is selected, so as to create a triangulation effect between the camera, the light projector and the light reflected back from the user's hand 810 and the background 820.

The triangulation effect causes discontinuities in the pattern at the points along a strip where there are significant depth shifts from an object projected with a light pattern. The discontinuities segment (i.e., divide) the strip into two or more strip segments, say a segment 831 positioned on the hand, a segment 832 position to the left of the hand and a segment 833 position to the right of the hand.

Such depth shift generated strip segments may be located on the contours of the user's hand's palm or digits, which are positioned between the camera and the user's body. That is to say that the user's digit or palm segments the strip into two or more strip segments. Once such a strip segment is detected, it is easy to follow the strip segment, to the strip segment's ends.

The device may thus analyze bi-dimensional video data, to generate clusters of strip segments. For example, the device may identify in the light pattern, a cluster of one or more strip segments created by segmentation of stripes by a digit of the hand, say a cluster 841 of four segments reflected from the hand's central finger. Consequently, the device tracks the movement of the digit, by tracking the cluster of strip segments created by segmentation of stripes by the digit, or by tracking at least one of the cluster's segments.

The cluster of strip segments created by segmentation (i.e., division) of stripes by the digit includes strip segments with an overlap in the X axis. Optionally, the strip segments in the cluster further have similar lengths (derived from the fingers thickness) or relative proximity in the Y-axis coordinates.

On the X-axis, the segments may have a full overlap for a digit positioned straightly, or a partial overlap for a digit positioned diagonally in the X-Y plane.

Optionally, the device further identifies a depth movement of the digit, say by detecting a change in the number of segments in the tracked cluster.

For example, if the user stretches the user's central digit, the angle between the digit and the plane of the light projector and camera (X-Y plane) changes. Consequently, the number of segments in the cluster 841 is reduced from four to three.

Optionally, the device further identifies in the light pattern, one or more clusters of one or more strip segments created by segmentation of stripes by a palm of the hand.

The cluster of strip segments created by segmentation of stripes by the palm includes an upper strip segment 831 which overlaps with the user hand's fingers strip segment clusters, in the X axis. The upper strip segment 831 overlaps the four finger clusters in the X-axis, but do not exceed beyond the minimum and maximum X value of the four finger clusters' bottom segments.

The cluster of strip segments created by segmentation of stripes by the palm further includes, just below segment 831, a few strip segments in significant overlap with the strip segment 831. The cluster of strip segments created by segmentation of stripes by the palm further includes longer strip segments that extend to the base of a stripsegment cluster 851 of the user's thumb. It is understood that the digit and palm cluster's orientation may differ with specific hands positions and rotation.

Advantageously, the power consumption of the device is sufficiently reduced to enable a non-interrupted and continuous operation, even when the source power is limited as in the case with smartphones. As explained above, some embodiments of the invention utilize pattern generation based on interferences in which the energy is spatially diverted as opposed to prior art solutions which involve energy blocking. The use of interference bases pattern generation is more efficient energy-wise. As further explained above, the generation of the depth map is based segments of the reflections which enable a partial pattern processing which reduces the computational intensity. This also contributes to reducing the overall power consumption. In some embodiments, the autofocus feature of the smartphone can be used in order to provide initial data regarding the range of the object that is being projected with the pattern. This also contributes to lower power consumption. All of the above low power consumption features significantly contribute to making the interface of a smartphone and a near eye display as a VR headset, possible from power consumption perspective.

Figure 9:
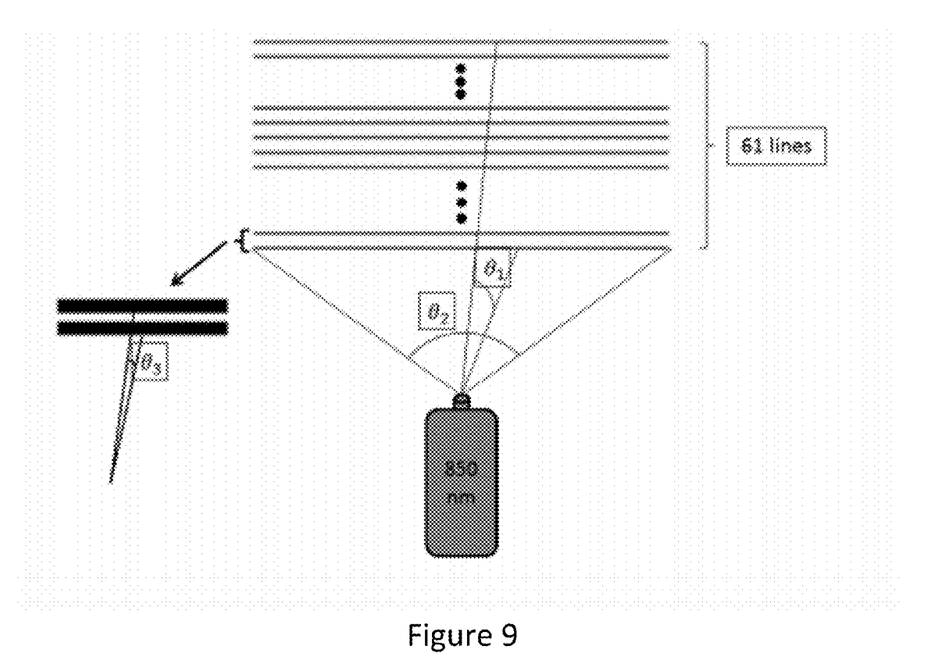
FIG. 9 is schematic view of a patterned light in accordance with embodiments of the present invention.

Reference is now made to FIG. 9 illustrating the resulted line pattern provided by the light source 110 and the optical elements as shown in FIGS. 1-3. The number of lines may be for example 61 lines. The line width may be 2 mm and the pattern may projected between 20-100 mm distances. The angles may be as follows: $\theta_1=60°$ presenting vertical opening of line array $\theta_2=90°$ presenting horizontal opening of lines $\theta_3=1°$ presenting the angular distance between lines.

The terms "comprises", "comprising", "includes", "including", "having" and their conjugates mean "including but not limited to". This term encompasses the terms "consisting of" and "consisting essentially of".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment. Conversely, various features of the invention, which, for brevity, are described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A virtual reality system comprising, in combination: a virtual reality headset;
   a smartphone mounted to the virtual reality headset and having a display serving as a near-eye display of the headset; and
   a body motion capture device mounted to the headset and coupled to the smartphone, the body motion capture device comprising:

an illuminator comprising a light generator system for generating a light pattern in a X-, Y-, Z-axis Cartesian coordinate system, wherein the light generator system comprises:
  a light source providing a diverging light beam directed along the Z-axis;
  a single lens element, said single lens element comprising:
    a first surface having a positive optical power in a first cross section;
    a second surface configured to provide a multiplication function of said beam in said at first cross section; and
    a predefined intensity light distribution generator formed on only one of the first and second surfaces, in a second cross section which is different from the first cross section; and
an infrared camera configured to capture reflections from surfaces illuminated by the illuminator; and
a pre-processor configured to process said reflections.

2. The system according to claim 1 wherein the single lens element comprises a beam splitting element.

3. The system according to claim 2 wherein the beam splitting element is formed in a first cross section of the second surface.

4. The system according to claim 3 wherein said first cross section is a Y-Z axis cross section.

5. The system according to claim 1 wherein the positive optical power is in a Y-Z axis cross section of the first surface of the single lens element.

6. The system according to claim 1 wherein the predefined intensity light distribution generator is a line generator.

7. The system according to claim 6 wherein the line generator is in a X-Z cross section of the first surface of the single lens element.

8. The system according to claim 6 wherein the line generator is in the form of a positive optical power selected from the group consisting of:
  aspheric lens, cylindrical lens, diffractive element, negative optical surface, combined negative/positive surface.

9. The system according to claim 1 wherein said light source providing a diverging laser beam is a laser source.

10. The system according to claim 1 wherein the multiplication function is obtained by a diffractive surface.

* * * * *